(12) United States Patent
Lee et al.

(10) Patent No.: US 10,939,039 B2
(45) Date of Patent: Mar. 2, 2021

(54) DISPLAY APPARATUS AND RECORDING MEDIUM

(71) Applicant: SAMSUNG ELECTRONICS CO., LTD., Suwon-si (KR)

(72) Inventors: Sang-moon Lee, Seongnam-si (KR); Sang-chul Ko, Seongnam-si (KR); Byeong-geun Cheon, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/317,424

(22) PCT Filed: May 22, 2017

(86) PCT No.: PCT/KR2017/005265
§ 371 (c)(1),
(2) Date: Jan. 11, 2019

(87) PCT Pub. No.: WO2018/012727
PCT Pub. Date: Jan. 18, 2018

(65) Prior Publication Data
US 2019/0320114 A1    Oct. 17, 2019

(30) Foreign Application Priority Data
Jul. 11, 2016    (KR) .................. 10-2016-0087670

(51) Int. Cl.
*H04N 5/232*    (2006.01)
*H04N 9/802*    (2006.01)

(52) U.S. Cl.
CPC ......... *H04N 5/23238* (2013.01); *H04N 9/802* (2013.01)

(58) Field of Classification Search
None
See application file for complete search history.

(56) References Cited

U.S. PATENT DOCUMENTS

| 5,714,997 | A | 2/1998 | Anderson |
| 8,296,155 | B2 | 10/2012 | Pang et al. |
| 9,196,257 | B2 | 11/2015 | Schultz-Amling et al. |
| 9,495,968 | B2 * | 11/2016 | Sen .................. G10L 19/008 |

(Continued)

FOREIGN PATENT DOCUMENTS

| EP | 2352290 A1 | 8/2011 |
| WO | 2016056411 A1 | 4/2016 |

OTHER PUBLICATIONS

Communication dated Jun. 3, 2019, issued by the European Patent Office in counterpart European Application No. 17827801.6.
(Continued)

*Primary Examiner* — Gelek W Topgyal
(74) *Attorney, Agent, or Firm* — Sughrue Mion, PLLC

(57) ABSTRACT

A display apparatus including: a display; a loudspeaker; a user input unit; a video processor configured to process a video signal to be displayed as an image on the display, and change a viewpoint of the image displayed on the display in response to a user input made through the user input unit; and an audio processor configured to process an audio signal to be output as a sound from the loudspeaker, determine acoustic features of the audio signal, and adjust the output of the sound from the loudspeaker according to the acoustic features in response to the user input.

13 Claims, 11 Drawing Sheets

(56) References Cited

U.S. PATENT DOCUMENTS

| | | | |
|---|---|---|---|
| 2004/0110561 A1* | 6/2004 | Kawamura | A63F 13/10 463/35 |
| 2007/0110258 A1 | 5/2007 | Kimijima | |
| 2008/0231548 A1* | 9/2008 | Koyama | G09G 3/003 345/6 |
| 2009/0006106 A1 | 1/2009 | Pang et al. | |
| 2009/0154896 A1 | 6/2009 | Matono | |
| 2010/0131278 A1* | 5/2010 | Chu | H04R 27/00 704/270 |
| 2012/0290297 A1 | 11/2012 | Baughman et al. | |
| 2013/0016842 A1 | 1/2013 | Schultz-Amling et al. | |
| 2013/0342731 A1* | 12/2013 | Lee | H04N 5/23293 348/231.4 |
| 2014/0358558 A1* | 12/2014 | Sen | H04S 5/005 704/500 |
| 2015/0055937 A1 | 2/2015 | Van Hoff et al. | |
| 2015/0058877 A1 | 2/2015 | Lakkundi et al. | |
| 2015/0131966 A1* | 5/2015 | Zurek | H04S 3/008 386/241 |
| 2015/0149166 A1 | 5/2015 | Jang et al. | |
| 2016/0182799 A1 | 6/2016 | Laaksonen et al. | |
| 2017/0339507 A1* | 11/2017 | Hsu | H04N 5/23238 |
| 2017/0374486 A1* | 12/2017 | Killham | H04N 13/279 |
| 2018/0242030 A1 | 8/2018 | Tsuji et al. | |

OTHER PUBLICATIONS

Communication dated Sep. 6, 2019, issued by the European Patent Office in counterpart European Application No. 17827801.6.

International Search Report (PCT/ISA/210), issued by International Searching Authority in International Application No. PCT/KR2017/005265, dated Aug. 29, 2017.

Communication dated May 13, 2020, issued by the European Patent Office in counterpart European Application No. 17827801.6.

* cited by examiner

DISPLAY APPARATUS AND RECORDING MEDIUM

TECHNICAL FIELD

The present disclosure relates to a display apparatus and a recording medium which are provided to output an image and sound of content by processing a content signal, and more particularly to a display apparatus and a recording medium which have a structure for adjusting video and audio output states in response to view information about an image changed by a user.

BACKGROUND ART

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus receives a content signal including video data from the exterior and processes the video data extracted from the content signal in accordance with various image processing processes. The image processing apparatus may display an image based on the processed video data on its own display panel, or output the processed video data to another display apparatus provided with a display panel so that the corresponding display apparatus can display an image based on the processed image signal. As a representative of the image processing apparatus that has no display panel, there is a set-top box. The image processing apparatus that has a display panel is called a display apparatus, and may for example includes a television (TV), a monitor, a portable multimedia player (PMP), a tablet computer, a mobile phone, etc.

With development of technology and diversification of user's tastes, content provided to the display apparatus has also advanced in various formats and methods. As one of the advancements in the content, an image resolution of the content has become higher like 4K, 8K, etc. beyond full high definition (FHD). Besides such a simple method of making the resolution higher, new methods may be employed in generating content. One example of the methods is that a predetermined object is captured by an omni-directional camera, i.e. a 360-degree camera to generate an omni-directional image content.

However, when the omni-directional image content generated by such a method is reproduced in the TV or the like display apparatus having a typical structure, many considerations are needed in both the video and audio aspects. For example, the display apparatus needs to determine what method will be used to display an image based on the omni-directional video content, and what method will be used to output a sound in sync with the displayed image. When the display apparatus uses a conventional method in reproducing video and audio content, a display state of an image may not match an output state of a sound. In this case, a problem arises in that a poor sense of presence is given to a user. To solve this problem, there is a need of providing in real time a user interactive environment for reflecting a user's intention in content reproduction when the display apparatus reproduces the omni-directional video content.

DISCLOSURE

Technical Solution

According to one aspect of the present disclosure, a display apparatus including: a display; a loudspeaker; a user input unit; a video processor configured to process a video signal to be displayed as an image on the display, and change a viewpoint of the image displayed on the display in response to a user input made through the user input unit; and an audio processor configured to process an audio signal to be output as a sound from the loudspeaker, determine acoustic features of the audio signal, and adjust the output of the sound from the loudspeaker according to the acoustic features in response to the user input. Thus, the display apparatus can provide an acoustic environment optimized to the features of the audio signal to a user.

The audio processor may determine the acoustic features by determining whether the audio signal is generated by live recording.

The audio processor may derive a first component corresponding to an audio component of a center channel from the audio signal, and a second component corresponding to an audio component obtained by subtracting the first component from either of a left channel or a right channel, and may determine that the audio signal is generated by the live recording when a power ratio between the first component and the second component is greater than a preset threshold value. The audio processor may determine that the audio signal is generated by the live recording when similarity between an audio component of a left channel and an audio component of a right channel is lower than a preset level in the audio signal. Further, the audio processor may determine whether the audio signal is generated by live recording or post-process recording in a studio when audio data is determined as a mixing or mastering signal by considering a mixing or mastering technique typically used in the studio like left and right panning.

The audio processor may not adjust the output of the sound from the loudspeaker regardless of the user input, when it is determined that the audio signal is generated by post-process recording. Thus, the display apparatus provides an improved sound field when the audio signal is generated by the live recording, and prevents an abnormal sound output even though the audio signal is not generated by the live recording.

The video signal may include a wide-angle image captured by a wide-angle camera, and the video processor may process a partial area of the wide-angle image to be displayed as the image on the display. Thus, the display apparatus can display the wide-angle image captured by the wide-angle camera such as a 360-degree camera.

The video processor may process the wide-angle image to be panned in response to the user input made to move a viewpoint of the user and displayed on the display, and the audio processor may determine change in position of a sound source due to the panning, and may adjust the output of the sound by controlling output power of audio components according to channels of the sound source in the audio signal corresponding to the changed position of the sound source. Thus, the display apparatus can improve an acoustic environment in accordance with the panning of the wide-angle.

The user input may include information about an angle between a default user viewpoint to the image and the moved user viewpoint.

The video processor may process the image to be zoomed in or out in response to the user input made to change a zoom depth of the image and displayed on the display, and the audio processor may determine change in distance of a sound source within the changed image with respect to a user, and may adjust the output of the sound by increasing and decreasing output power of an audio component of the sound source in the audio signal corresponding to the changed distance of the sound source. Besides, there may be additionally involved low-pass filtering or the like process of changing a frequency component of the sound source in accordance with change in distance of the sound source, or head-related transfer function (HRTF) filtering or the like process corresponding to the distance and direction. Thus, the display apparatus can improve an acoustic environment interworking with a viewing condition changed according as the image is zoomed in or out.

The audio processor may acquire view information provided along with the audio signal from a content provider, and may adjust the output of the sound from the loudspeaker in accordance with the acoustic features corresponding to the view information.

According to another aspect of the present disclosure, a recording medium, in which a program code of a method implementable and processible by a processor of a display apparatus including a display and a loudspeaker, the method including: displaying an image on the display; outputting a sound from the loudspeaker; changing a viewpoint of the image displayed on the display in response to a user input; determining acoustic features of an audio signal, and adjusting the output of the sound from the loudspeaker according to the acoustic features in response to the user input. Thus, the display apparatus can provide an optimized acoustic environment corresponding to the features of the audio signal to a user.

The adjusting of the output of the sound from the loudspeaker may include determining the acoustic features by determining whether the audio signal is generated by live recording.

The determining of the acoustic features may include: deriving a first component corresponding to an audio component of a center channel from the audio signal, and a second component corresponding to an audio component obtained by subtracting the first component from either of a left channel or a right channel; and determining that the audio signal is generated by the live recording when a power ratio between the first component and the second component is greater than a preset threshold value. The determining of the acoustic features may includes: determining that the audio signal is generated by the live recording when similarity between an audio component of a left channel and an audio component of a right channel is lower than a preset level in the audio signal.

The adjusting of the output of the sound from the loudspeaker may include preventing the output of the sound from the loudspeaker from being adjusted regardless of the user input, when it is determined that the audio signal is generated by post-process recording.

The image may include a wide-angle image captured by a wide-angle camera, and the displaying of the image on the display may include displaying a partial area of the wide-angle image as the image on the display.

The changing of the viewpoint of the image may include making the wide-angle image be panned in response to the user input made to move a viewpoint of the user and displayed on the display, and the adjusting of the output of the sound from the loudspeaker may include: determining change in position of a sound source due to the panning; and adjusting the output of the sound by controlling output power of audio components according to channels of the sound source in the audio signal corresponding to the changed position of the sound source.

The user input may include information about an angle between a default user viewpoint to the image and the moved user viewpoint.

The changing of the viewpoint of the image may include making the image be zoomed in or out in response to the user input made to change a zoom depth of the image and displayed on the display, and the adjusting of the output of the sound from the loudspeaker may include: determining change in distance of a sound source within the changed image with respect to a user; and adjusting the output of the sound by increasing and decreasing output power of an audio component of the sound source in the audio signal corresponding to the changed distance of the sound source.

The adjusting of the output of the sound from the loudspeaker may include: acquiring view information provided along with the audio signal from a content provider; and adjusting the output of the sound from the loudspeaker in accordance with the acoustic features corresponding to the view information.

BEST MODE

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the invention. Further, in the embodiments, descriptions will be made with regard to only elements directly related to the concept of the present disclosure, and descriptions about the other elements will be omitted.

Figure 1:
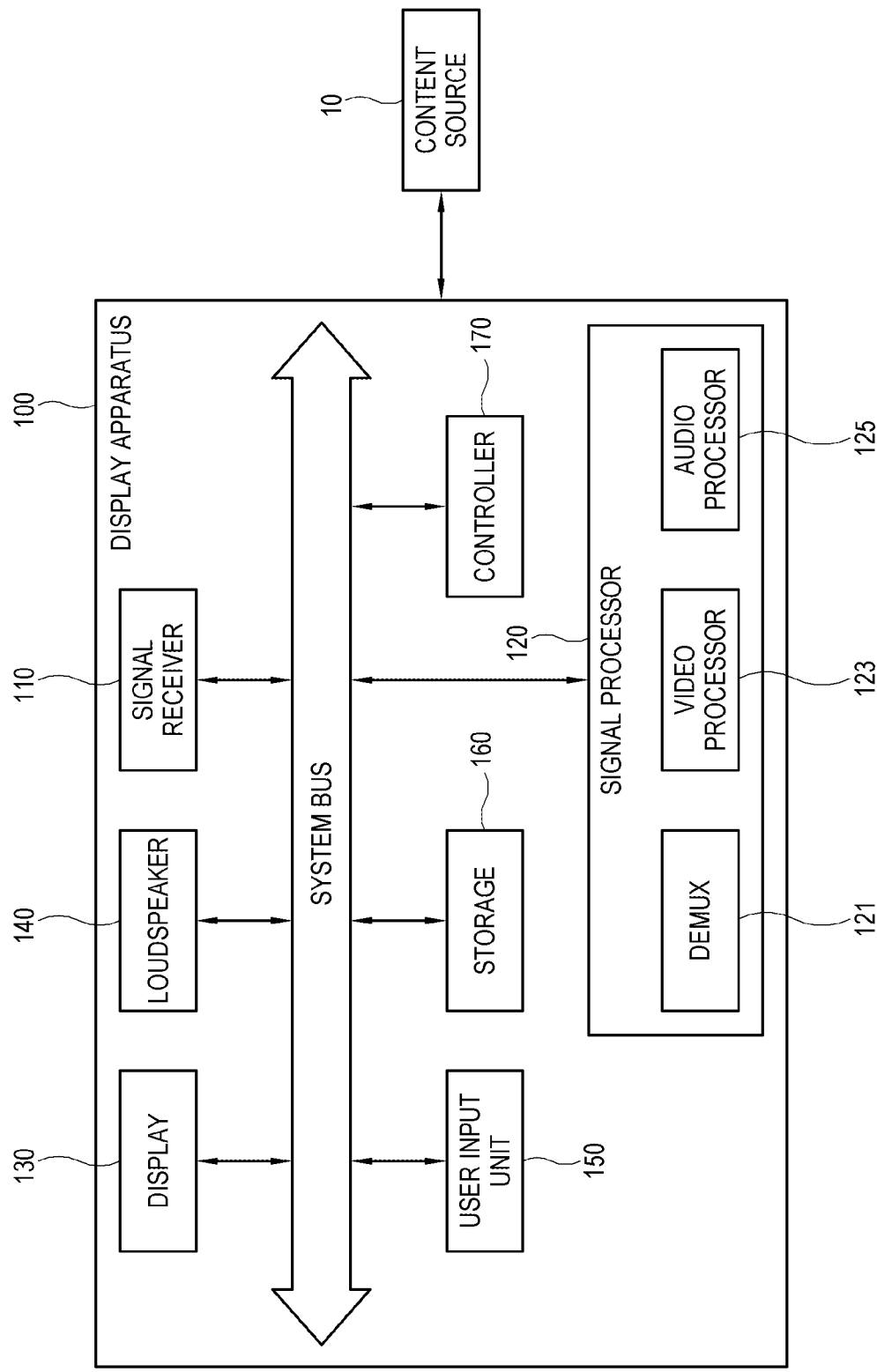
FIG. 1 is a block diagram showing a configuration of the display apparatus according to an embodiment of the present disclosure.

FIG. 1 is a block diagram showing a configuration of a display apparatus 100 according to an embodiment of the present disclosure.

As shown in FIG. 1, the display apparatus 100 according to an exemplary embodiment receives a content signal from various content sources 10. In this exemplary embodiment, the display apparatus 100 is achieved by a TV, but this is not the only one example where the present inventive concept is materialized. Alternatively, the present inventive concept may be applied to various kinds of apparatus that can process a content signal and display a content image, such as a tablet computer, a personal computer, a mobile phone, a wearable device, etc.

The display apparatus 100 includes a signal receiver 110 for receiving a content signal from the content source 10, a signal processor 120 for processing the content signal received through the signal receiver 110, a display 130 for displaying a content image based on the content signal processed by the signal processor 120, a loudspeaker 140 for outputting a content sound based on the content signal processed by the signal processor 120, a user input unit 150 for receiving a user input, a storage 160 for storing data, and a controller 170 for performing calculations for the process of the signal processor 120 and control for general operations of the display apparatus 100. These elements are connected to one another through a system bus.

The signal receiver 110 includes a communication module for receiving a content signal from the content source 10 and the like external apparatuses. The signal receiver 110 is an element for basically receiving a signal or data from the exterior, but not limited thereto. Alternatively, the signal receiver 110 may be used for interactive communication. For example, the signal receiver 110 includes at least one among elements such as a tuning chip to be tuned to a frequency designated for a radio frequency (RF) broadcast signal, an Ethernet module to receive packet data from the Internet by a wire, a wireless communication module to wirelessly receive packet data, a connection port to which a universal serial bus (USB) memory and the like external memory is connected, etc. That is, the signal receiver 110 includes a data input interface where communication modules or ports respectively corresponding to various kinds of communication protocols are combined.

The signal processor 120 performs various processes with respect to a content signal received in the signal receiver 110 so that content can be reproduced. The signal processor 120 includes a hardware processor realized by a chipset, a buffer, a circuit and the like mounted to a printed circuit board, and may be designed as a system on chip (SoC) as necessary. Fundamentally, the signal processor 120 processes a content signal so that a content image can be displayed on the display 130 and a content sound can be output through the loudspeaker 140.

The signal processor 120 includes a demultiplexer (de-MUX) 121 for de-multiplexing a content signal into a video signal and an audio signal, a video processor 123 for processing the video signal output from the DEMUX 121 by a video processing process so that the content image can be displayed on the display 130, and an audio processor 125 for processing the audio signal output from the DEMUX 121 by an audio processing process so that the content sound can be output from the loudspeaker 140.

The DEMUX 121 divides the packets of the multiplexed content signal in accordance with PID, thereby de-multiplexing the content signal into sub signals such as a video signal, an audio signal, an appendix data signal, etc. The DEMUX 121 outputs the video signal among the sub signals to the video processor 123, and outputs the audio signal to the audio processor 125. However, the content signal does not have to be always divided by the DEMUX 121. When the content signal is provided to the display apparatus 100 as it is divided into the video signal and the audio signal, the de-multiplexing process of the DEMUX 121 may be not required.

The video processor 123 is achieved by a hardware processor chip, and performs the video processing process such as decoding, image enhancement, scaling, etc. with regard to a video signal, thereby outputting the processed video signal to the display 130. As necessary, the video processor 123 may be achieved by combination of a plurality of processor chips.

The audio processor 125 is achieved by a hardware digital signal processor (DSP), and performs the audio processing process such as channel division, amplification, volume control, etc. with regard to an audio signal, thereby outputting the processed audio signal to the loudspeaker 140. If the loudspeaker 140 includes a plurality of unit loudspeakers, the audio processor 125 divides and processes the audio signal according to channels, and respectively outputs the processed signals to the unit loudspeakers according to the channels.

The display 130 displays an image based on a video signal processed by the video processor 123. There are no limits to the type of the display 130, and the display 130 may including a display panel having a light receiving structure such as a liquid crystal display (LCD), or a self-emissive structure such as an organic light emitting diode (OLED). In addition to the display panel, the display 130 may further include another structure according to the types of the display panel. For example, in a case of the LCD, the display 130 includes an LCD panel, a backlight unit for emitting light to the LCD panel, and a panel driving substrate for driving the LCD panel, etc.

The loudspeaker 140 outputs a sound based on audio data processed by the signal processor 120. The loudspeaker 140 includes a unit loudspeaker corresponding to audio data of one audio channel. For example, if audio data is of a plurality of audio channels, the loudspeaker 140 includes the plurality of unit loudspeakers corresponding to the audio data.

The user input unit 150 transmits various preset control command or information to the controller 170 in response to a user's control or input. That is, the user input unit 150 sends the signal processor 120 various events caused by a user's control corresponding to a user's intention, so that the controller 170 can operate corresponding to the event.

The user input unit 150 may be variously achieved in accordance with information input methods. For example, the user input unit 150 includes user interface environments installed in the display apparatus 100, such as a key provided in an outer side of the display apparatus 100, a touch screen provided in the display 130, a microphone for receiving a user's voice, a camera or sensor for photographing or sensing a user's gesture or the like, etc. A remote controller may be an example of the user interface environments. The remote controller is separately provided from a main body of the display apparatus 100, and therefore transmits a control signal to the display apparatus 100 through a separate control signal receiver provided in the main body of the display apparatus 100.

The storage 160 stores various pieces of data under the processes of the signal processor 120 and the control of the controller 170. The storage 160 is accessed by the signal processor 120 and the controller 170 so that the data can be read, written, modified, updated and so on. The storage 160 includes a nonvolatile memory such as a flash memory, a hard disc drive (HDD), a solid-state drive (SSD) and the like to retain data regardless of whether the display apparatus 100 is powered on or off; and a volatile memory such as a buffer, a random-access memory (RAM) and the like to which data to be processed by the signal processor 120 is temporarily loaded.

The controller 170 is achieved by a central processing unit (CPU), a microprocessor, etc. and thus controls operations of elements such as the signal processor 120 in the display apparatus 100.

Below, a detailed embodiment where the video processor 123 and the audio processor 125 respectively process a video signal and an audio signal will be described.

Figure 2:
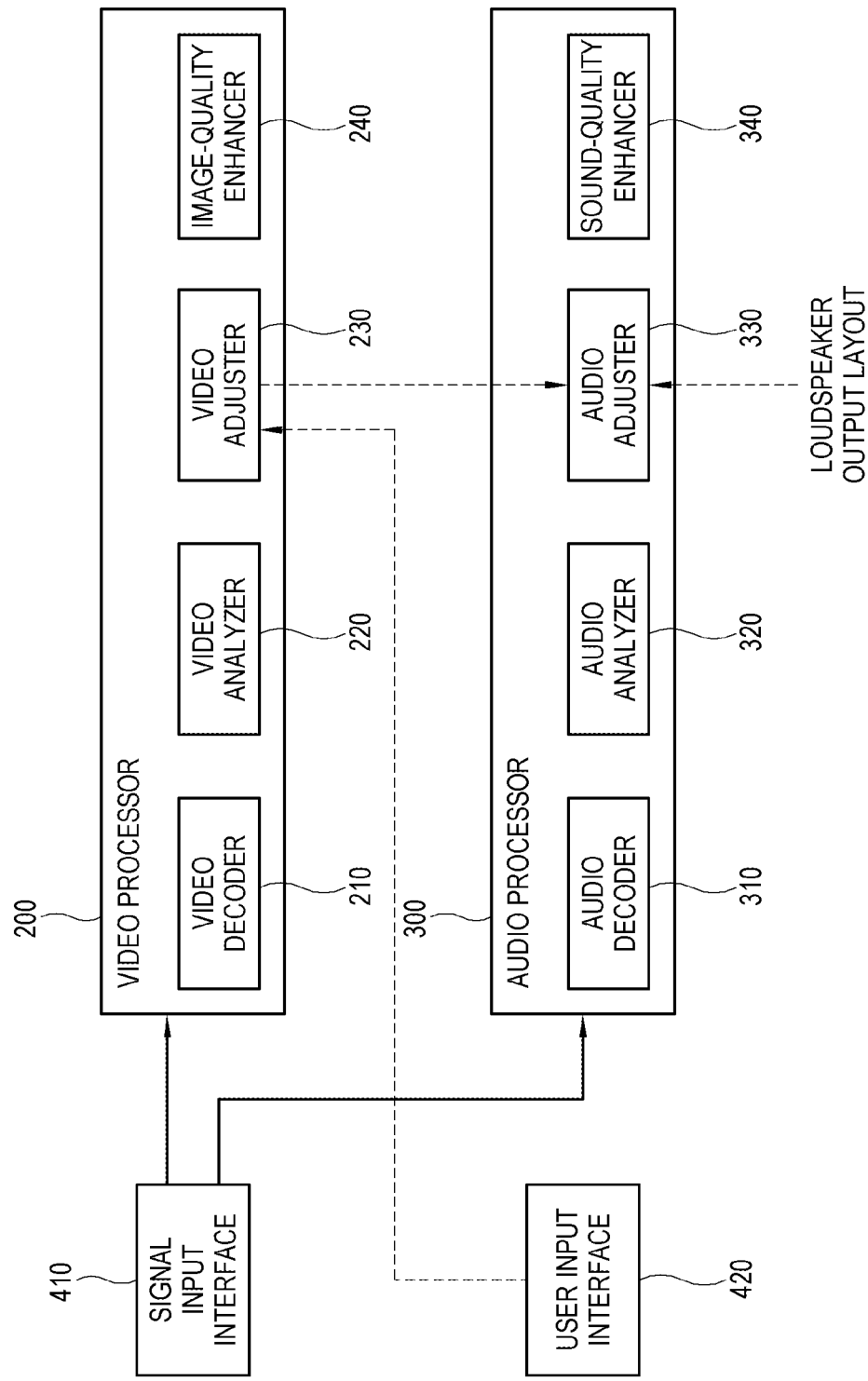
FIG. 2 is a block diagram showing a schematic processing structure of a video processor and an audio processor in a display apparatus according to an embodiment of the present disclosure.

FIG. 2 is a block diagram showing a schematic processing structure of a video processor 200 and an audio processor 300 in a display apparatus according to an embodiment of the present disclosure.

As shown in FIG. 2, a video signal is input to the video processor 200 and an audio signal is input to the audio processor 300 through a signal input interface 410. The video signal and the audio signal input through the signal input interface 410 may be provided from a content source in various forms. For example, the signal received through the signal input interface 410 may be transmitted from a set-top box in accordance with high definition multimedia interface (HDMI) standards, provided from a server through a network, provided from a universal serial bus (USB) memory, or provided from a wireless device through Bluetooth communication. Alternatively, an image being captured by a camera may be provided in real time from the signal input interface 410.

A user input interface 420 receives a user input in various forms. When the display apparatus is installed as stationary like a TV, a user signal input through the user input interface 420 may correspond to an operation that a user presses a button of a remote controller, or interwork with a pressure sensor, a touch pad or the like installed in the remote controller. Alternatively, when the display apparatus is portable by a user like a portable device, a user input signal may correspond to a gyro sensor or acceleration sensor installed in the display apparatus. Besides, the user input signal may correspond to a user's gesture captured by a camera, or a user's sound input through a microphone.

The video processor 200 includes a video decoder 210, a video analyzer 220, a video adjuster 230, and an image-quality enhancer 240. Further, the audio processor 300 includes an audio decoder 310, an acoustic analyzer 320, an acoustic adjuster 330, and a sound-quality enhancer 340. Of course, these elements are related to the embodiments of the present disclosure, and therefore other elements may be additionally provided when the video processor 200 and the audio processor 300 are actually materialized.

Such elements of the video processor 200 and the audio processor 300 may be materialized by a hardware chipset, software including a programming code, or combination of hardware and software. For example, the video processor 200 may be materialized by a processor chip, and these elements may be materialized by program codes to be processed by the video processor 200.

Video processing operations of the video processor 200 are as follows. The video decoder 210 decodes a video signal received through the signal input interface 410. The video analyzer 220 analyzes various pieces of feature information of video signal needed for displaying the decoded video signal as an image. The video adjuster 230 processes a video signal so that a display state of an image can be adjusted based on user input information received through the user input interface 420. The image-quality enhancer 240 performs a process for improving quality of an image displayed based on a video signal.

Further, audio processing operations of the audio processor 300 are as follows. The audio decoder 310 decodes an audio signal received through the signal input interface 410. The acoustic analyzer 320 analyzes various pieces of feature information of audio signal needed for outputting the decoded audio signal as a sound. The acoustic adjuster 330 processes an audio signal so that an output state of a sound can be adjusted in response to the display state of the image changed by the video adjuster 230. The sound-quality enhancer 340 performs a process for improving quality of a sound output based on an audio signal.

Like this, when the video adjuster 230 adjusts a display state of an image in response to a user input signal received through the user input interface 420, that is, when a viewpoint of an image displayed on the display is adjusted, the sound-quality enhancer 340 performs a process so that the output state of the sound can be adjusted corresponding to the adjusted display state of the image. Below, an embodiment of the present disclosure applied when a content signal is on an image captured by a 360-degree camera, i.e. a wide-angle video content will be will be described.

A parameter of a user input signal transmitted from the user input interface 420 to the video adjuster 230 may include a user's viewpoint coordinates with respect to an image, a view angle of the image, a zoom depth of the image, etc. The video adjuster 230 adjusts the display state of the image on the basis of such a parameter, and transmits information based on adjustment results to the acoustic adjuster 330. Here, the information transmitted from the video adjuster 230 to the acoustic adjuster 330 may further include information about a current image output mode, view information intended by a content provider, etc.

The image output mode indicates what mode an image is currently displayed in. There may be many image output modes, for example, a 360-degree image mode, a panorama mode, a multi-view mode, etc. In the 360-degree image mode camera, a partial area of a captured whole image is displayed on the display. When a user adjusts a viewpoint on the whole image, the whole image is panned and thus another area of the whole image is displayed on the display. In the panorama mode, an image captured for example in all directions of 360 degrees is spread on a plane and the spread image is displayed on the display. In the multi-view mode, a display area of the display is divided into some areas and a plurality of images are respectively displayed on the divided areas.

As an example of the view information intended by the content provider, specific information may be displayed at a specific viewpoint of content. In this case, the view information is given by a time function, and involved as metadata in the content.

The acoustic adjuster 330 basically acquires loudspeaker output layout information, and outputs an audio signals corresponding to a channel to a unit loudspeaker of each channel. The loudspeaker output layout information includes channel information of a unit loudspeaker installed with the display apparatus, feature information of the loudspeaker, etc. When receiving information from the video adjuster 230, the acoustic adjuster 330 adjusts the audio output state of the loudspeaker on the basis of the received information.

It will be described later in detail that the video adjuster 230 adjusts a display state of an image and the acoustic adjuster 330 adjusts an output state of a sound.

Meanwhile, in the foregoing description, a user input signal is transmitted from the user input interface 420 to the video adjuster 230, and video process information is transmitted from the video adjuster 230 to the acoustic adjuster 330 so that the acoustic adjuster 330 can cope with the video process information. However, this is merely one example of embodiments for the display apparatus. Alternatively, a user input signal from the user input interface 420 may be transmitted to each of the video adjuster 230 and the acoustic adjuster 330, so that the acoustic adjuster 330 can cope with the user input signal.

Further, not only a user input signal from the user input interface 420 but also view information intended by the content provider may be given. The view information refers to information previously prepared so that when an image and a sound of content can be optimally provided to a user in terms of displaying the image and outputting the sound, and for example contains designated information such as a viewpoint of an image, a zoom depth of an image, a volume of a sound, an amplification level according to frequencies, etc. The view information may be transmitted from the video adjuster 230 to the acoustic adjuster 330 after being transmitted to the video adjuster 230, or may be transmitted to each of the video adjuster 230 and the acoustic adjuster 330. Thus, the display apparatus provides an image and a sound on the basis of the view information.

The view information is present in a content signal provided from a content source in the form of metadata or appended data together with a video signal and an audio signal, and is extracted from the content signal by demultiplexing. Further, the view information is given in the content signal by a time function, and therefore the display apparatus determines which point in time when each view information will be applied at while displaying an image.

The video signal output from the video processor 200 is transmitted to the display, and the audio signal output from the audio processor 300 is output to the loudspeaker. Here, each processing operation of the video processor 200 and the audio processor 300 is carried out in sync with a system clock of the display apparatus. To synchronize the image displayed on the display and the sound output from the loudspeaker, the display apparatus may further include a synchronizer or the like element for synchronizing the video signal output from the video processor 200 and the audio signal output from the audio processor 300 in response to the system clock.

Like this, the display apparatus reproduces an image and a sound to interwork with each other in accordance with a user's requests for change in a viewpoint, a view angle, a zoom depth, etc., thereby providing a view environment for a good sense of presence.

In terms of processing a sound on the basis of video process information received from the video adjuster 230, the acoustic adjuster 330 may additionally carry out a process for adjusting the output state of the sound when a condition of a specific acoustic feature is satisfied, but otherwise skipping the adjustment of the audio output state. Such a process is performed in the acoustic analyzer 320. That is, when the acoustic analyzer 320 determines that the condition is satisfied, the acoustic adjuster 330 adjusts the output state of the sound in accordance with change in the display state of the image. When the acoustic analyzer 320 determines that the condition is not satisfied, the acoustic adjuster 330 does not change the output state of the sound even though the display state of the image is changed.

As one example of the process, the acoustic analyzer 320 may determine whether the audio signal is generated by live recording. When the acoustic analyzer 320 determines that the audio signal is generated by the live recording, the acoustic adjuster 330 adjusts the output state of the sound in accordance with the display state of the image. On the other hand, when the acoustic analyzer 320 determines that the audio signal is not generated by the live recording, i.e. determines that the audio signal is caused by mixing, the acoustic adjuster 330 does not adjust the output state of the sound even though the display state of the image is changed.

When a camera captures a predetermined object or circumstance to generate a content image, one or more microphones may collect a sound from a predetermined object or circumstance in sync with capturing of the camera, and generate a content sound. Such a generated content sound mirrors change in the object or circumstance like the content image, and therefore the content sound corresponds to the content image. Such a method of generating the content sound is called the live recording.

On the contrary to the live recording, there is post-process recording such as mixing or mastering. The mixing includes two types of mixing, and one of the mixing types is that the content provider artificially adjusts a volume or the like acoustic features of an audio signal generated by the live recording according to the captured objects. For example, music concert content may be adjusted to turn a voice volume of an audience down and turn a voice volume of a singer up.

The other one is that the content provider adds a separately recorded audio signal to an audio signal generated by live recording or uses a separately recorded audio signal instead of an audio signal generated by live recording to be applied to content. For example, a narration and background music may be added to a documentary content.

When the audio signal is generated by the live recording, the content sound is provided corresponding to the captured circumstance like the content image. Accordingly, in this case, the display apparatus adjusts the output state of the content sound in response to a user input, thereby providing an enhanced sense of presence to a user.

On the other hand, when the audio signal is not generated by the live recording, the content image is provided corresponding to the captured circumstance but the content sound may be provided without corresponding to the captured circumstance. In this case, when the output state of the content sound is adjusted in response to a user input, it is highly likely to distort an acoustic effect intended by the content provider that provides the content. Therefore, in this case, the display apparatus does not adjust the output state of the content sound even though a user input is received.

Thus, the display apparatus provides more enhanced acoustic environments to a user in accordance with the features of the content sound.

Below, a method of controlling the display apparatus according to an embodiment of the present disclosure will be described.

Figure 3:
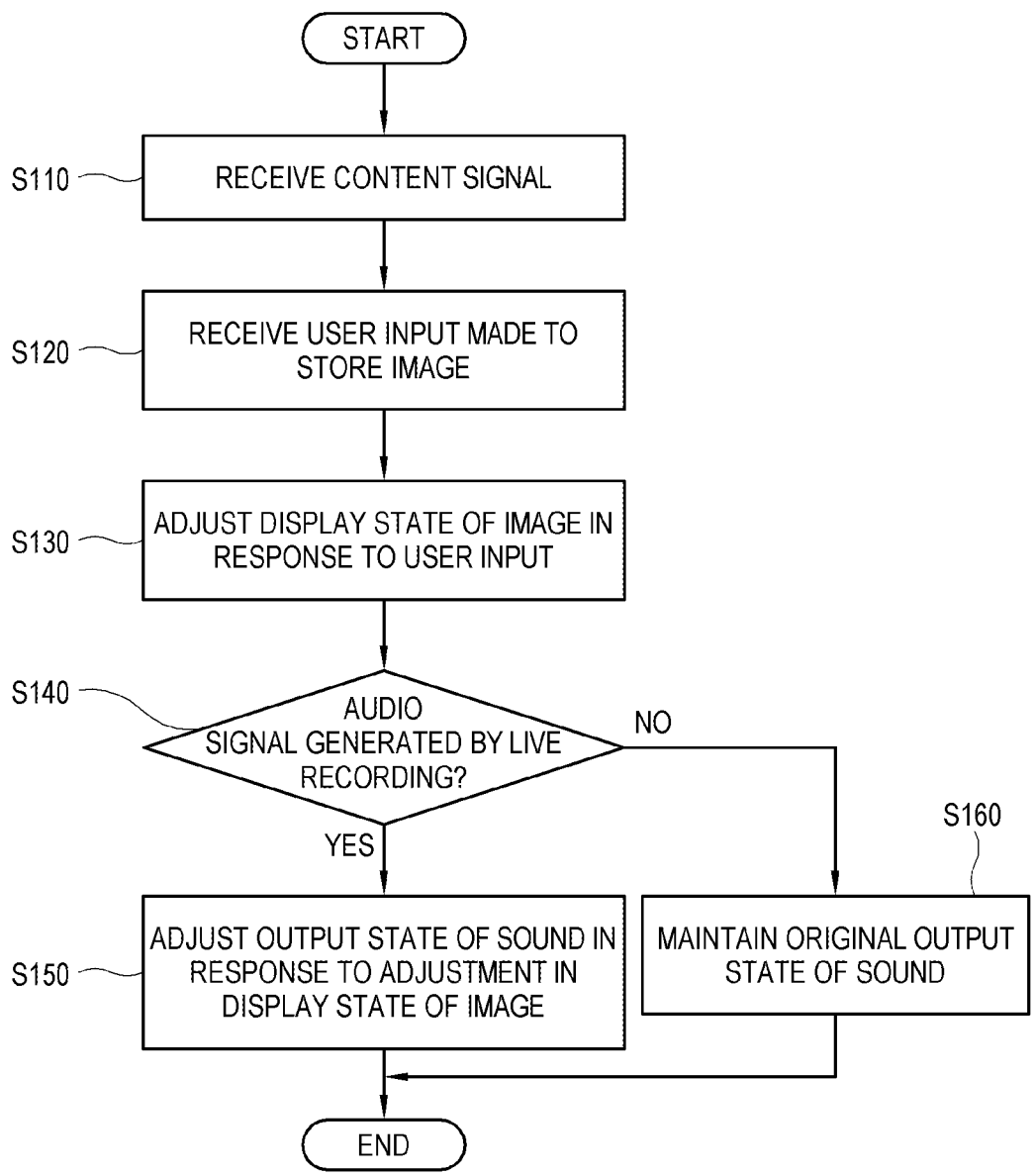
FIG. 3 is a flowchart of processing an audio signal in a display apparatus according to an embodiment of the present disclosure.

FIG. 3 is a flowchart of processing an audio signal in a display apparatus according to an embodiment of the present disclosure.

As shown in FIG. 3, at operation S110 the display apparatus receives a content signal. The display apparatus separates a video signal and an audio signal from the received content signal and processes each signal.

At operation S120 the display apparatus receives a user input for video adjustment.

At operation S130 the display apparatus adjusts a display state of an image in response to the user input.

At operation S140 the display apparatus determines whether the audio signal is generated by live recording.

When it is determined that the audio signal is generated by the live recording, at operation S150 the display apparatus adjusts the output state of the sound in accordance with adjustment in the display state of the image.

On the other hand, when it is determined that the audio signal is not generated by the live recording, at operation S160 the display apparatus keeps the original state of the sound without adjusting the output state of the sound.

Below, a detailed example of adjusting the display state of the image and the output state of the sound will be described.

Figure 4:
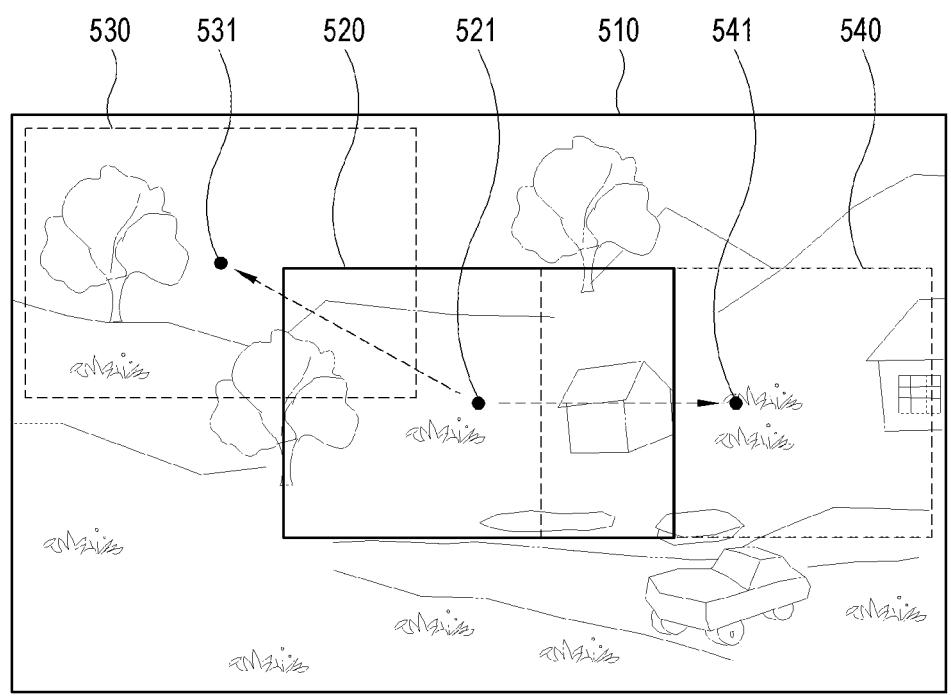
FIG. 4 is a view illustrating that a whole image of wide-angle video content is displayed in a display apparatus according to an embodiment of the present disclosure.

FIG. 4 is a view illustrating that a whole image 510 of wide-angle video content is displayed in a display apparatus according to an embodiment of the present disclosure.

As shown in FIG. 4, a 360-degree camera or the like wide-angle camera may capture a predetermined object and generate a whole image 510 the size of which is larger than an actually display area of a display of a general display apparatus. The size and resolution of the whole image 510 are varied depending on the characteristics of the camera, and thus not limited to specific numerical values.

A first position 521 in the whole image 510 is determined by default, and a first area 520 around the first position 521 is displayed on the display as default in the whole image 510. Unless a specific user input is made, the display apparatus basically displays the first area 520 within the whole image 510.

Here, it will be assumed that a user input is made to move his/her viewpoint leftward and upward from the first position 521. The user input indicates that a user's viewpoint moves from the first position 521 to a second position 531 on the whole image 510. In response to the user input, the display apparatus displays a second area 530 around the second position 531 instead of the first area 520. In light of the whole image 510, the currently displayed area moves from the first area 520 to the second area 530, and therefore this operation is called image panning.

Further, a user input may be made to move a user's viewpoint rightward from the first position 521. In this case, the user input indicates that the user's viewpoint moves from the first position 521 to a third position 541 on the whole image 510. Thus, the display apparatus displays a third area 540 around the third position 541 instead of the first area 520.

A user input may be made through various interfaces. When the display apparatus is stationary like a TV, the user input may be made through touch pad control or button control of a remote controller. Alternatively, when the display apparatus is portable by a user like a mobile apparatus, a user input may be made through a gyro sensor or acceleration sensor installed in the display apparatus.

Thus, the display apparatus adjusts the display state of the image in response to change in a user's viewpoint.

Figure 5:
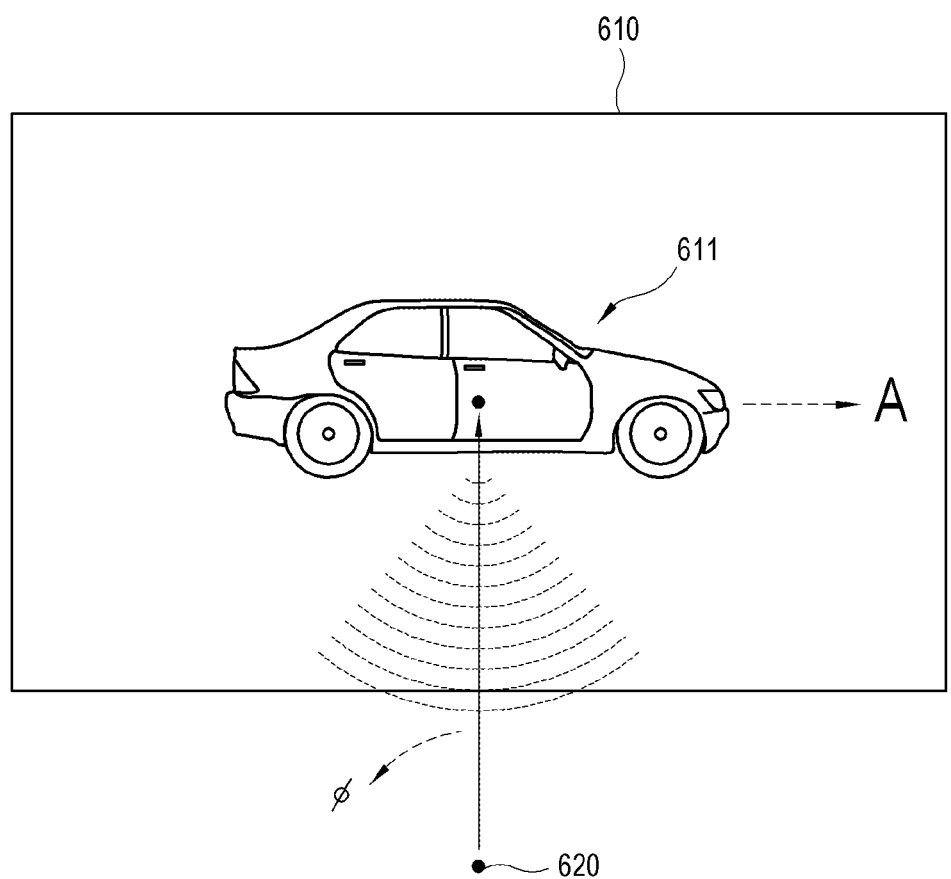
FIG. 5 is a view illustrating that an image including a predetermined object is displayed in a display apparatus according to an embodiment of the present disclosure.

FIG. 5 is a view illustrating that an image 610 including a predetermined object 611 is displayed in a display apparatus according to an embodiment of the present disclosure.

As shown in FIG. 5, the display apparatus displays the image 610 including the certain object 611 at a predetermined point in time t(0). The image 610 refers to a partial area of the wide-angle image displayed on the display as described above with reference to FIG. 4. At this point in time, a user's viewpoint 620 has φ(0) of 0 degrees, and a user is looking at the object 611 from the front.

In this case, the display apparatus outputs a sound by mirroring a state the object 611 is positioned in front of a user. For example, when the display apparatus outputs a sound through stereo channels, output power may be balanced between a left (L) channel and a right (R) channel of an audio component corresponding to the object 611 in the audio signal.

In this state, it will be taken into account that the user's viewpoint 620 counterclockwise rotates from 0 degrees to 30 degrees, in other words, that φ(0) having 0 degrees at a point in time of t(0) is changed to φ(1) of 30 degrees at a point in time of t(1). This means that a user's viewpoint moves leftward with respect to the object 611, and the image is thus displayed as if the object 611 relatively moves rightward, i.e. in a direction of A with respect to the user.

Figure 6:
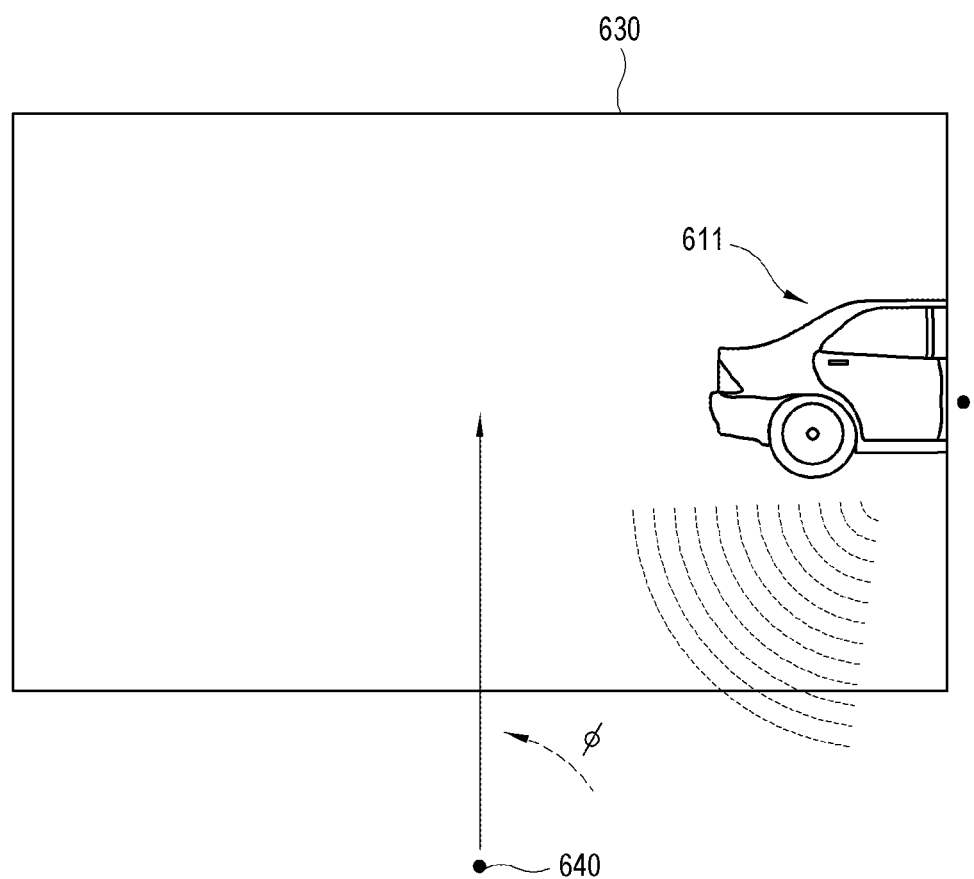
FIG. 6 is a view illustrating that an image is changed when a user's viewpoint is moved counterclockwise at an angle of 30 degree from the state of FIG. 5.

FIG. 6 is a view illustrating that an image 630 is changed when a user's viewpoint is moved counterclockwise at an angle of 30 degree from the state of FIG. 5.

As shown in FIG. 6, when a user's viewpoint 640 has φ(1) of 30 degrees at a point in time t(1), the display apparatus makes the whole image be panned to thereby display an image 630 corresponding to a user's viewpoint 640. The image 630 is displayed as if the object 611 moves from the center rightward as compared with that of FIG. 5.

First, it will be taken into account that a sound output remains without change when the image is changed as above corresponding to the user's viewpoint 640. In this case, a user may feel as if the sound of the object 611 is made from the front even though the object 611 is positioned right with respect to the user's viewpoint 640. This brings a mismatch between the image and the sound to a user.

Thus, the display apparatus adjusts the output state of the sound in accordance with change in the display state of the image 630. In this embodiment, the display apparatus outputs a sound for the object 611 from the right of the user's viewpoint 640 to the user according as the object 611 moves on the right of the user's viewpoint 640. For example, the display apparatus may adjust the audio components for the object 611 in the audio signal so that the R channel can have higher output power than the L channel.

Like this, the display apparatus can respectively adjust the display state of the image and the output state of the sound in accordance with change in a user's viewpoint.

Figure 7:
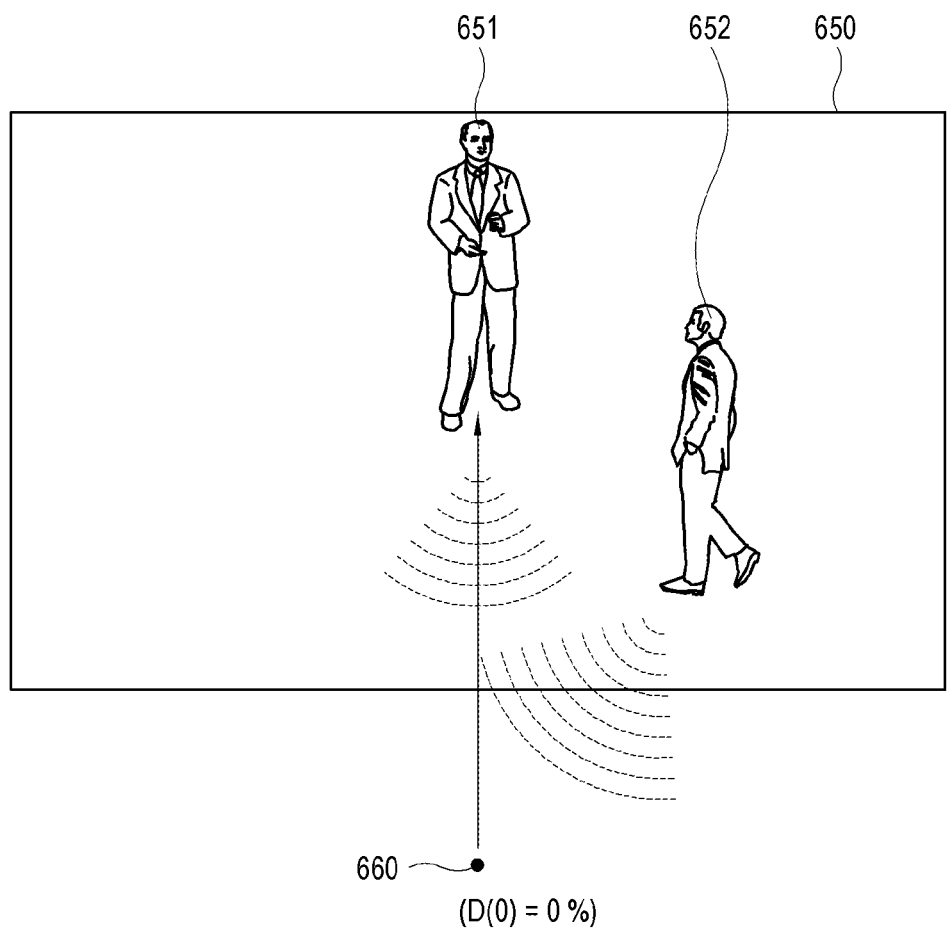
FIG. 7 is a view illustrating that an image including a plurality of objects is displayed in a display apparatus according to the present embodiment.

FIG. 7 is a view illustrating that an image 650 including a plurality of objects 651 and 652 is displayed in a display apparatus according to the present embodiment, As shown in FIG. 7, the display apparatus displays the image 650 including the plurality of objects 651 and 652. For example, when the image 650 contains the first object 651 and the second object 652, the first object 651 is positioned on a user's viewpoint 660 and the second object 652 is positioned on the right of the user's viewpoint 660.

Further, sounds are output corresponding to the first object 651 and the second object 652, respectively. The sound corresponding to the second object 652 is more loudly output than the sound corresponding to the first object 651 by considering the positions thereof. When the second object 652 is positioned closer to the user's viewpoint 660 than the first object 651 without being relatively apart from an axial line of the user's viewpoint 660, the sound for the second object 652 may be louder than the sound for the first object 651.

In this state, the user's viewpoint may be changed as described in the foregoing embodiment. However, alternatively, only a zoom depth may be adjusted without changing the user's viewpoint. When the zoom depth D(0) is 0% at time t(0), a user's input may be made to increase the zoom depth so that a current image can be displayed as enlarged.

Figure 8:
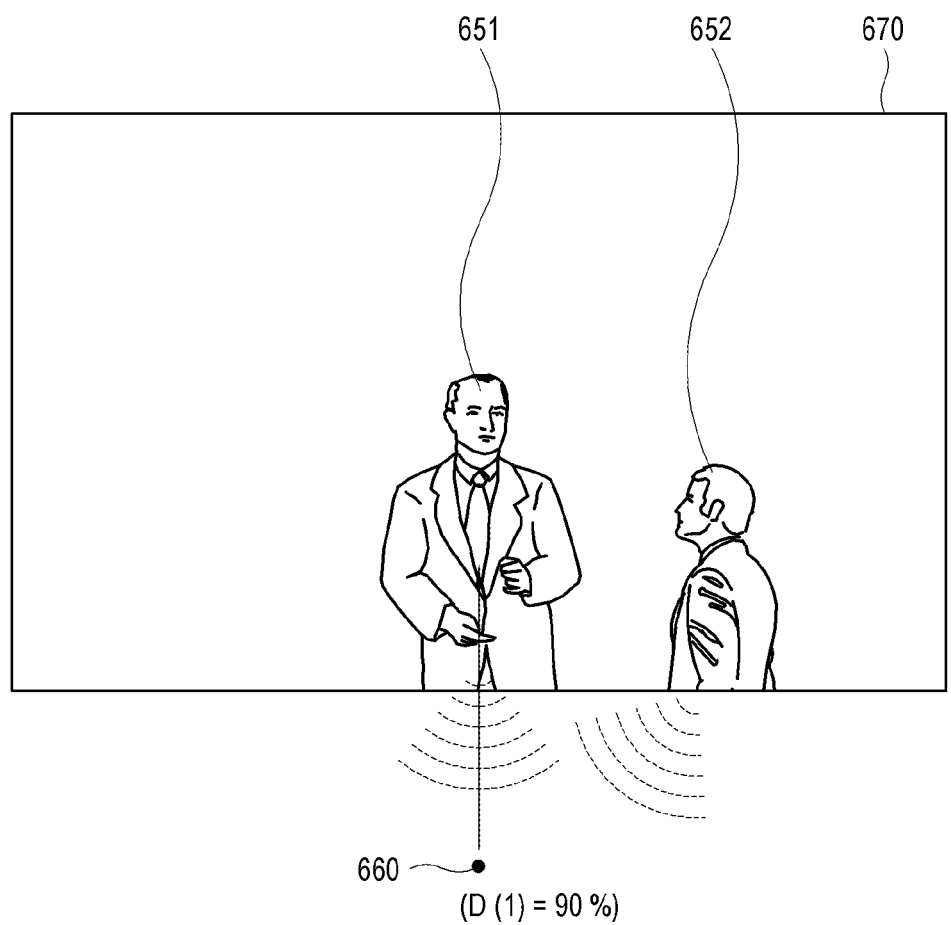
FIG. 8 is a view illustrating that an image is changed when a zoom depth is increased from the state of FIG. 7.

FIG. 8 is a view illustrating that an image 670 is changed when a zoom depth is increased from the state of FIG. 7.

As shown in FIG. 8, when the zoom depth is increased to D(1)=90% as time elapses from t(0) to t(1), the display apparatus displays the image 670 enlarged centering on the first object 651 in accordance with the increased zoom depth. Since the user's viewpoint 660 is not changed from that of FIG. 7, the first object 651 is positioned at the center of the image 670 and the second object 652 is positioned on the right of the image 670.

The display apparatus adjusts the sound output in accordance with the adjustment in the display state of the image 670. Specifically, the first object 651 gets closer on the user's viewpoint 660, and therefore the display apparatus increases the output power of the audio component for the first object 651 in the audio signal and decreases the output power of the other audio components for the second object 652 or the like, thereby enhancing articulation of the sound for the first object 651.

Meanwhile, as described above, the display apparatus adjusts the output state of the sound in accordance with change in the display state of the image when it is determined that an audio signal is generated by live recording, but does not adjust the output state of the sound even though the display state of the image is changed when it is determined that the audio signal is not generated by the live recording. Here, the display apparatus performs a sound-quality enhancing process of the sound-quality enhancer 340 (see FIG. 2) when the output state of the sound is adjusted, and performs preset space filtering when the output state of the sound is not adjusted.

The space filtering is to give various additional effects to the audio signal, and may for example include various processes such as Decorrelation, Stereo Widening, Distance Filter, Reverberation/De-reverberation, etc.

The display apparatus may refer to various pieces of information or various parameters while processing an audio signal and outputting a sound. As information needed for processing the audio signal, there are 'nChannels', 'chPCM', 'chType', 'nMics', 'micPositions', 'micType', etc.

Here, 'nChannels' relates to information about the number of audio channels such as 'stereo', '3.1', '5.1', etc. 'chPCM' relates to information about raw data of an audio channel. 'chType' relates to information about an identification value of an audio component for determining an audio source for an object in an audio signal. 'nMics' relates to information about a type of a microphone used in collecting a sound, for example, an omni-directional microphone, a directional microphone, etc. 'micPositions' relates to information about an absolute position or relative position between microphones, such as a space between the microphone in an array, etc. when the microphones are provided in the array. Besides, there may be used additionally pieces of information and parameters necessary for outputting or adjusting a sound.

Meanwhile, the display apparatus may refer to various pieces of information to adjust the output state of the sound. As an example of such information, there are 'panoramaFlag', 'multiviewFlag', 'screenwidth', 'screenHeight', 'horiFOV/vertFOV', 'userZoomDepth', 'userOrientation', etc. These pieces of information are a value transmitted from the video adjuster 230 (see FIG. 2) to the acoustic adjuster 330 (see FIG. 2) by approximately mirroring the change in the display state of the image, but may be alternatively transmitted from the user input interface 420 (see FIG. 2).

Here, 'panoramaFlag' relates to information about whether an image output mode is a panorama mode. The display apparatus applies not left/right sound image control but only up/down sound image height control to the audio signal at 'panoramaFlag'=0, but applies both the left/right sound image control and the up/down sound image control at 'panoramaFlag'=1. This is because an image extended left and right is output in the panorama mode.

'multiviewFlag' relates to information about whether the image output mode is a multi-view mode. The display apparatus simultaneously displays images from a plurality of viewpoints on one screen at 'multiviewFlag'=0, and at this time an audio signal is directly output from the audio processor without operating the acoustic adjuster 330 (see FIG. 2). For example, when the number of multi-views displayed on one screen is N and a user selects nth screen, multiviewFlag=n. In this case, the display apparatus adjusts the audio signal after operating the acoustic adjuster 330 (FIG. 2) corresponding to the user's viewpoint of the n-th screen.

'screenwidth' and 'screenHeight' relate to information about a physical size of the display. 'horiFOV' and 'vertFOV' relate to a field of view in horizontal and vertical directions of a displayed image. When 'screenwidth' and 'screenHeight' are very greater than 'horiFOV' and 'vertFOV', it is determined that the zoom depth is increased. In this case, the display apparatus may increase output power of a sound for an object corresponding to a user's viewpoint, and decrease output power of a sound for other objects or circumstances surrounding the object. On the other hand, when 'horiFOV' and 'vertFOV' become relatively very large, it is determined that the current mode is the panorama mode, and thus the display apparatus may perform acoustic adjustment corresponding to the foregoing panorama mode.

'userZoomDepth' is to apply an acoustic effect given for a zoom-in part of an image when the zoom depth increases as described above. For example, the display apparatus determines whether an object is present corresponding to a user's viewpoint, and performs a process for amplifying a sound for the determined object. When a viewpoint of an image viewed by a user, i.e. orientation information is changed, the display apparatus may adjust the position of the sound image by reversely compensating the change.

Besides the parameters described above, additional pieces of information may be used in acoustic adjustment.

Among the foregoing pieces of information, 'nChannels' and 'chPCM' are data generally obtained after audio decoding, 'chType', 'nMics', 'micPositions' and 'micType' are parameters needed for an acoustic analysis. Meanwhile, 'panoramaFlag', 'multiviewFlag', 'screenwidth', 'screen- Height', 'horiFOV/vertFOV', 'userZoomDepth' and 'userOrientation' are not the parameters transmitted along with the audio signal, but the parameters transmitted by the video processor or a user input. 'panoramaFlag', 'multiviewFlag', 'screenwidth', 'screenHeight' and 'horiFOV/vertFOV' are received from the video processor, and 'userZoomDepth' and 'userOrientation' are received by a user input. Alternatively, the foregoing information may be received along with the audio signal or received through the UI and thus transmitted via the same path as metadata of the video signal.

In the foregoing exemplary embodiment, the display apparatus determines whether the audio signal is generated by the live recording. In detail, there are many methods of determining the live recording, and an embodiment in this regard will be described below.

Figure 9:
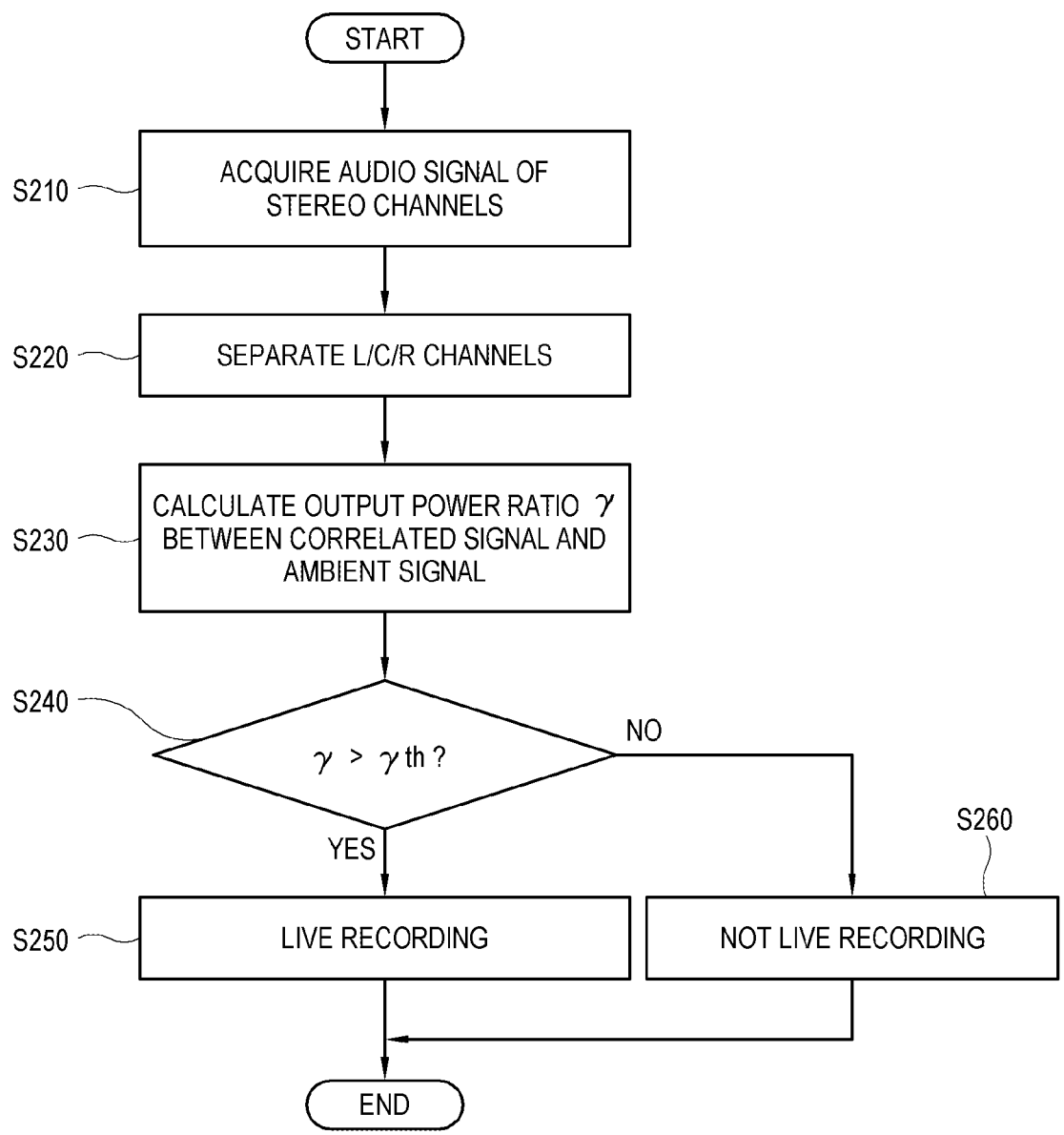
FIG. 9 is a flowchart of determining whether an audio signal is generated by live recording in a display apparatus according to an embodiment of the present disclosure.

FIG. 9 is a flowchart of determining whether an audio signal is generated by live recording in a display apparatus according to an embodiment of the present disclosure.

As shown in FIG. 9, at operation S210 the display apparatus acquires an audio signal of stereo channels.

At operation S220 the display apparatus separates an L channel, an R channel, and a center (C) channel from an audio signal. The C channel refers to an audio component that the left channel and the right channel have in common with each other in the audio signal.

At operation S230 the display apparatus an output power ratio between a correlated signal and an ambient signal. Here, the correlated signal refers to an audio component of a center channel. The ambient signal refers to an audio component obtained by subtracting an audio component of the center channel from an audio component of the left channel, or an audio component obtained by subtracting an audio component of the center channel from an audio component of the right channel.

The output power ratio Γ between the correlated signal and the ambient signal may be represented in various forms, and may for example represented by the following expression.

$$\Gamma = 20 * \log_{10}[(\Sigma_n |L'[n]|)/(\Sigma_n |C'[n]|)]$$ [Expression]

where, L is the left channel, and C is the center channel. In this expression, L may be replaced by R.

At operation S240 the display apparatus determines whether the output power ratio Γ between the correlated signal and the ambient signal is greater than a preset threshold value $\Gamma_{th}$.

In a case of $\Gamma > \Gamma_{th}$, at operation S250 the display apparatus determines that the audio signal is generated by the live recording. On the other hand, in a case of $\Gamma \leq \Gamma_{th}$, at operation S260 the display apparatus determines that the audio signal is not generated by the live recording.

When a sound is not mixed in a studio but generated by live recording using a microphone array in an actual space, effects based on reverberation and noise in the circumstances where the sound is collected are also collected in microphones. When the content provider does not perform preprocesses for removing noise or the like, the effects based on the reverberation and noise are involved in the audio channels. Therefore, the display apparatus determines the live recording by estimating the power ratio of the ambient signal to the correlated signal.

Figure 10:
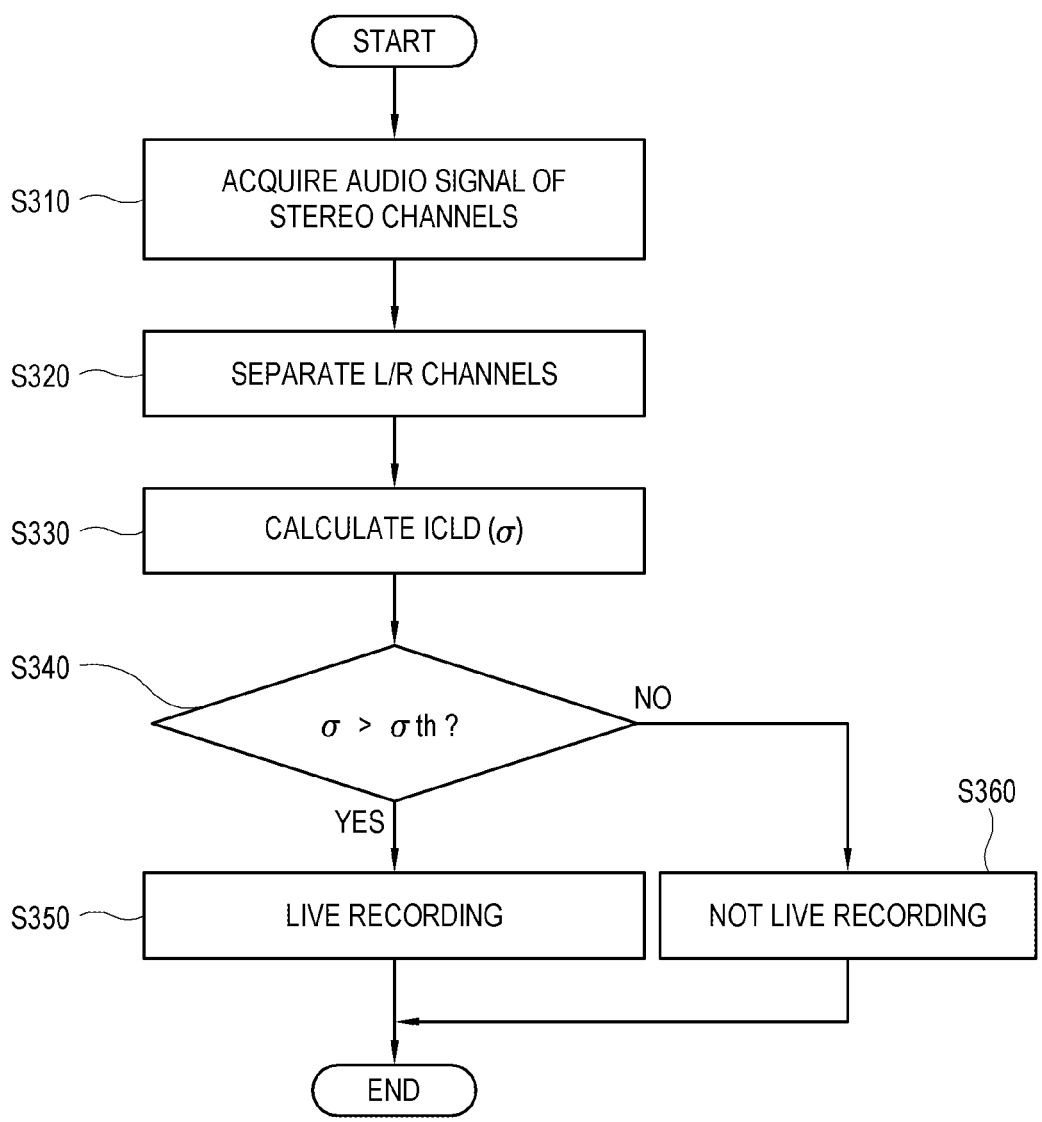
FIG. 10 is a flowchart of determining whether an audio signal is generated by live recording in a display apparatus according to another embodiment of the present disclosure.

FIG. 10 is a flowchart of determining whether an audio signal is generated by live recording in a display apparatus according to another embodiment of the present disclosure.

As shown in FIG. 10, at operation S310 the display apparatus acquires an audio signal of stereo channels.

At operation S320 the display apparatus separates an L channel and an R channel from the audio signal.

At operation S330 the display apparatus calculates an inter-channel level difference (ICLD) (σ). As a technique frequently used for audio mixing in a studio, an amplitude panning technique of applying the same signal to the L/R signals is employed. By determining the presence of such audio mixing, it may be reversely estimated that the audio signal is not generated by the live recording. For example, when power deviation is large between the L channel and the R channel of the sound for the object within an image corresponding to a predetermined period of time, the audio signal is highly likely to be generated by the live recording. On the other hand, when the power deviation is small between the L channel and the R channel of the sound for the object, the audio signal is highly likely to be caused by mixing. On this principle, the ICLD may be calculated based on a transfer function between the L/R channels with respect to a time-frequency domain or each individual domain of time and frequency.

At operation S340 the display apparatus determines whether the ICLD (σ) is greater than a preset threshold value ($\sigma_{th}$).

In a case of $\sigma > \sigma_{th}$, at operation S350 the display apparatus determines that the audio signal is generated by the live recording. On the other hand, in a case of $\sigma \leq \sigma_{th}$, at operation S360 the display apparatus determines that the audio signal is not generated by the live recording.

Alternatively, the display apparatus may determine the live recording in accordance with whether the audio signal is a type of dual mono. For example, the dual mono indicates that the audio component of the left channel of the audio signal is the same as or highly similar to the audio component of the right channel. The dual mono is a type that appears in the mixing, and hardly appears in the live recording. Thus, the display apparatus determines that the audio signal is not generated by the live recording when the audio signal is the type of dual mono, but determines that the audio signal is generated by the live recording when the audio signal is not the type of dual mono.

In this manner, the display apparatus readily determines whether the audio signal is generated by the live recording.

Below, details of adjusting a sound by the acoustic adjuster of the display apparatus will be described.

Figure 11:
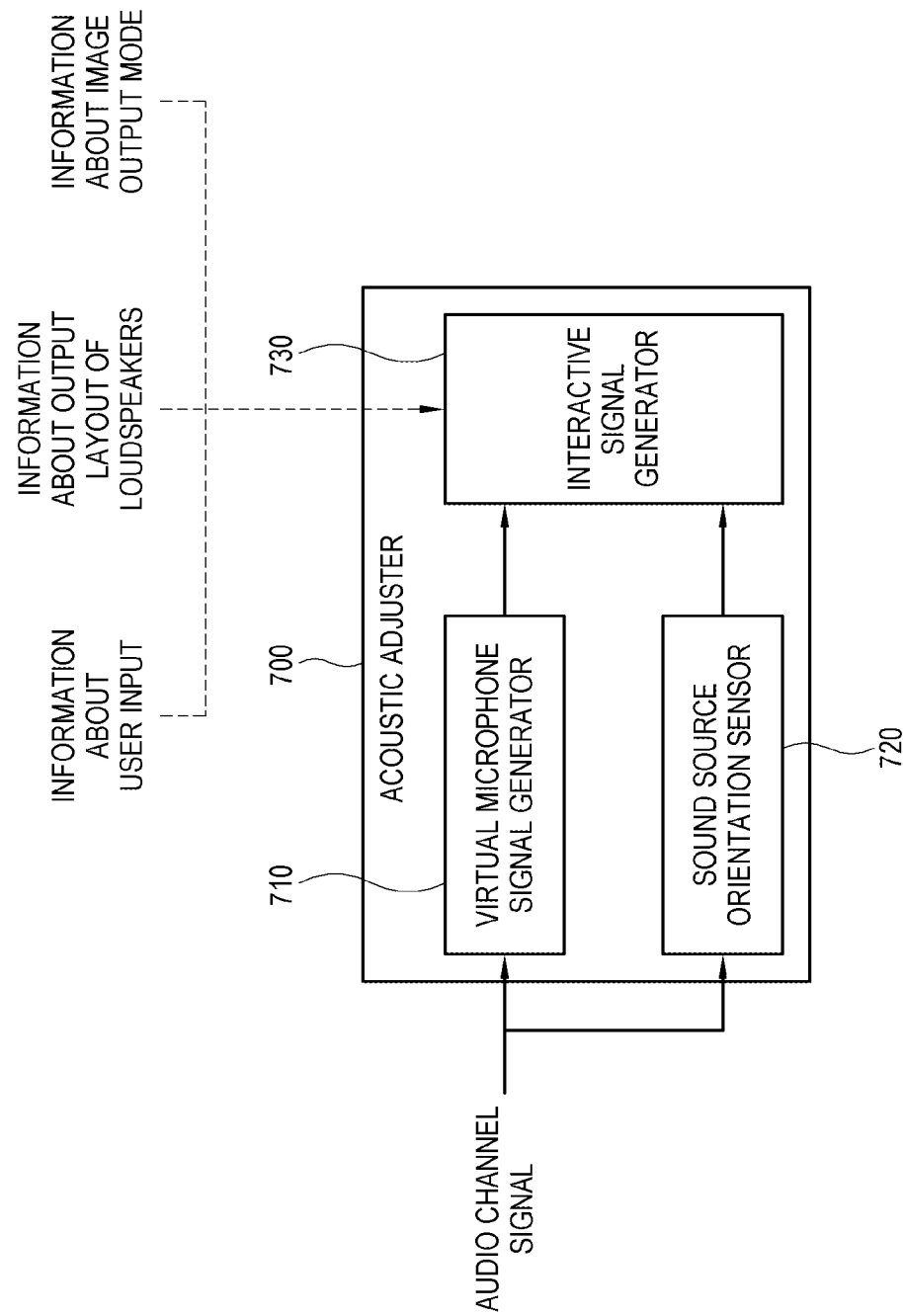
FIG. 11 is a block diagram showing an acoustic adjuster used in a display apparatus according to an embodiment of the present disclosure.

FIG. 11 is a block diagram showing an acoustic adjuster 700 used in a display apparatus according to an embodiment of the present disclosure.

As shown in FIG. 11, an image and a sound have to be adjusted according to parameters based on a user input, for example, a user's viewpoint, a view angle, a zoom depth, etc., and therefore the acoustic adjuster 700 processes an audio signal to thereby adjust the output state of the sound.

Data of each channel of the audio signal is input to a virtual microphone signal generator 710 and a sound source orientation sensor 720.

The virtual microphone signal generator 710 may perform functions such as 'Channel Separation', 'Ambience Extraction', or 'Center Channel Separation' to separate components having orientation and components having no orientation from audio components of the audio signal. Further, the virtual microphone signal generator 710 may perform up-mix or the like for increasing channels more than actual channels of the audio signal through 'M-Nch Format Converter (M<N)' or 'Decorrelation'.

When objects respectively serving as sound sources are present in an image, the sound source orientation sensor 720 acquires orientation information of each object. The orientation information of the object may be acquired by measuring inter-channel time difference (ICTD). The ICTD may be estimated by slope calculation of a phase according to frequency bins of the audio signal on a frequency domain, time sample calculation corresponding to a peak in a phase transform generalized cross correlation (PHAT GCC) or the like technique of GCC, zero-crossing calculation, etc.

An interactive signal generator 730 generates audio information for reproducing a sound image to be transferred to a viewer at a current viewpoint in accordance with an output loudspeaker layout, on the basis of orientation information of a sound source, a virtual microphone signal, and information about change in a user's viewpoint.

In this case, when an audio signal generated by live recording is processed, orientation ($\varphi_s$) may be estimated by the sound source orientation sensor 720. When a sound source not generated by live recording but mixed or mastered in a studio is processed, the interactive signal generator 730 may be applied on the assumption that ($\varphi_s$) is 0 degrees, i.e. the front. A user's viewpoint information ($\varphi_v$) is measurable through a user interface. Ultimately, the interactive signal generator 730 may apply a panning coefficient to an audio component having orientation or an audio component separated into the center channel of the audio data received from the virtual microphone signal generator 710 so that the audio component can be positioned in a ($\varphi_s-\varphi_v$) orientation, but may not apply the panning coefficient to the other components such as ambient components. In this case, the panning coefficient may be generated by 'Vector-based Amplitude Panning/Phase Panning' or the like technique on the basis of the loudspeaker output layout information Meanwhile, when a user input is made to change the zoom depth, the acoustic adjuster 700 may compare the orientation of the object sensed by the sound source orientation sensor 720 with a viewpoint at which a user changes the zoom depth, thereby determining whether the object is positioned at a zoom position. When the orientation of the object matches a zoom direction, the acoustic adjuster 700 amplifies the audio component for the object while making the power of the other ambient signals be panned leftward and rightward or be decreased, thereby providing a zooming effect.

Like this, the display apparatus according to an embodiment of the present disclosure makes an image and a sound interwork with each other according to viewing conditions desired by a user such as a viewpoint, a view angle, a zoom depth, etc., and be transmitted to the user in real time, thereby providing a view environment for a good sense of presence.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a volatile or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

The invention claimed is:

1. A display apparatus comprising:
   a display;
   a loudspeaker;
   a user input unit;
   a video processor configured to process a video signal to be displayed as an image on the display, and change a viewpoint of the image displayed on the display in response to a user input made through the user input unit; and
   an audio processor configured to:
      process an audio signal to be output as a sound from the loudspeaker,
      determine acoustic features of the audio signal by identifying whether the audio signal is generated by live recording,
      based on identifying that the audio signal is generated by live recording, adjust the output of the sound from the loudspeaker according to the change of the viewpoint of the image in response to the user input, and
      based on identifying that the audio signal is not generated by live recording, maintain an original state of the output of the sound from the loudspeaker.

2. The display apparatus according to claim 1, wherein the audio processor derives a first component corresponding to an audio component of a center channel from the audio signal, and a second component corresponding to an audio component obtained by subtracting the first component from either of a left channel or a right channel, and identifies that the audio signal is generated by the live recording when a power ratio between the first component and the second component is greater than a preset threshold value.

3. The display apparatus according to claim 1, wherein the audio processor identifies that the audio signal is generated by the live recording when similarity between an audio component of a left channel and an audio component of a right channel is lower than a preset level in the audio signal.

4. The display apparatus according to claim 1, wherein the audio processor does not adjust the output of the sound from the loudspeaker regardless of the user input, when it is identified that the audio signal is generated by post-process recording.

5. The display apparatus according to claim 1, wherein the video signal comprises a wide-angle image captured by a wide-angle camera, and
   the video processor processes a partial area of the wide-angle image to be displayed as the image on the display.

6. The display apparatus according to claim 5, wherein the video processor processes the wide-angle image to be panned in response to the user input made to move a viewpoint of a user and displayed on the display, and
   the audio processor determines a change in position of a sound source due to the panning, and adjusts the output of the sound by controlling an output power of audio components according to channels of the sound source in the audio signal corresponding to the change in position of the sound source.

7. The display apparatus according to claim 6, wherein the user input comprises information about an angle between a default user viewpoint to the image and the moved viewpoint of the user.

8. The display apparatus according to claim 5, wherein the user input is an input to change a zoom depth of the image displayed on the display, and the video processor processes the image to be zoomed in or out in response to the user input, and the audio processor determines a change in distance of a sound source within the changed image with respect to a user, and adjusts the output of the sound by increasing and decreasing an output power of an audio component of the sound source in the audio signal corresponding to the change in distance of the sound source.

9. The display apparatus according to claim 1, wherein the audio processor acquires view information provided along with the audio signal from a content provider, and adjusts the output of the sound from the loudspeaker corresponding to the view information.

10. A non-transitory recording medium which stores a program code that is executed by a processor of a display apparatus to perform a method comprising:

displaying an image on a display of the display apparatus;

outputting a sound from a loudspeaker of the display apparatus;

changing a viewpoint of the image displayed on the display in response to a user input;

determining acoustic features of an audio signal by identifying whether the audio signal is generated by live recording, based on identifying that the audio signal is generated by live recording, adjusting the output of the sound from the loudspeaker according to the change of the viewpoint of the image in response to the user input, and based on identifying that the audio signal is not generated by live recording maintaining an original state of the output of the sound from the loudspeaker.

11. The non-transitory recording medium according to claim 10, wherein the determining of the acoustic features comprises:

deriving a first component corresponding to an audio component of a center channel from the audio signal, and a second component corresponding to an audio component obtained by subtracting the first component from either of a left channel or a right channel; and determining that the audio signal is generated by the live recording when a power ratio between the first component and the second component is greater than a preset threshold value.

12. The non-transitory recording medium according to claim 10, wherein the determining of the acoustic features comprises:

identifying that the audio signal is generated by the live recording when similarity between an audio component of a left channel and an audio component of a right channel is lower than a preset level in the audio signal.

13. The non-transitory recording medium according to claim 10, wherein the adjusting of the output of the sound from the loudspeaker comprises preventing the output of the sound from the loudspeaker from being adjusted regardless of the user input, when it is identified that the audio signal is generated by post-process recording.

* * * * *